Sept. 24, 1929.　　　M. E. ANDERSON　　　1,729,469

AIR VALVE

Filed Jan. 26, 1926

Inventor

Martin E Anderson

Patented Sept. 24, 1929

1,729,469

UNITED STATES PATENT OFFICE

MARTIN E. ANDERSON, OF DENVER, COLORADO

AIR VALVE

Application filed January 26, 1926. Serial No. 83,808.

This invention relates to improvements in devices for automatically limiting the pressure to which one chamber may be inflated when attached to a supply containing a fluid at a higher pressure than that desired.

The present invention relates more particularly to a pressure control valve for use in inflating automobile tires. Garages and filling stations everywhere keep a supply of air under pressure, for the use of their customers in inflating their tires. This air is usually maintained at a pressure of 125 to 200 pounds per square inch which is far above that required for inflating tires as the present day balloon tires use pressures as low as 30 pounds while cord and fabric tires seldom require more than 70 pounds per square inch.

Tires are usually inflated by what may be termed a "cut, fit and try" method, that is they are connected with the supply for a short time and the pressure is then tested by a gauge, if it is too high some air is let out and if it is too low more air is forced into the tire; by this means the proper pressure is finally attained.

Attempts have been made by me to produce a control device that can be connected in the air passage between the high pressure supply and the tire and which will automatically close the entrance to the tire when the pressure reaches the desired value. This problem, which at first sight seems so simple, presents many practical difficulties which have not been satisfactorily overcome by my previous devices which are merely modified reducing valves. Some of the difficulties to be overcome will be enumerated here as the device which will be presently described has been designed to overcome these.

It is necessary to inflate the tires as quickly as possible because automobile drivers, as we all know, are restless and do not care to waste more time inflating tires than is absolutely necessary.

The pressure at which the valve closes should be determined by the pressure in the tire and not by that in the supply.

These two requirements have been found to be antagonistic in character for if the speed in inflation is increased, the pressure is determined almost exclusively from that of the supply and if the device is made so as to be operated from the pressure in the tire, the speed of operation has to be reduced.

In the device that forms the subject of this invention, and which will presently be described in detail, the above difficulties have been overcome to a great extent by the simple expedient of reducing the area of the inlet port shortly before the maximum tire pressure is reached so as to have an inlet port as large as practicable at the beginning and reducing it towards the close of the inflation period so that the closing of the valve will be more nearly controlled by the pressure in the tire.

These and other objects to which attention will be called as the description proceeds are attained by means of a simple construction that will now be described in detail, reference for this purpose being had to the accompanying drawing in which the preferred embodiment of the invention has been illustrated and in which.

Figure 1:
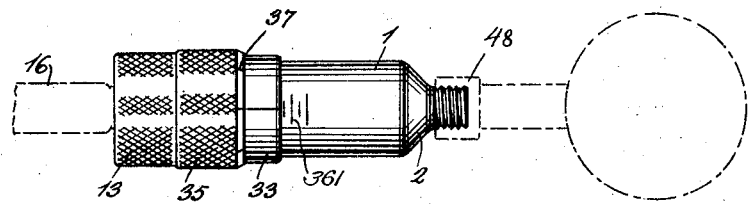
Fig. 1 is an elevation showing the control valve to approximately full scale.
Figure 2:
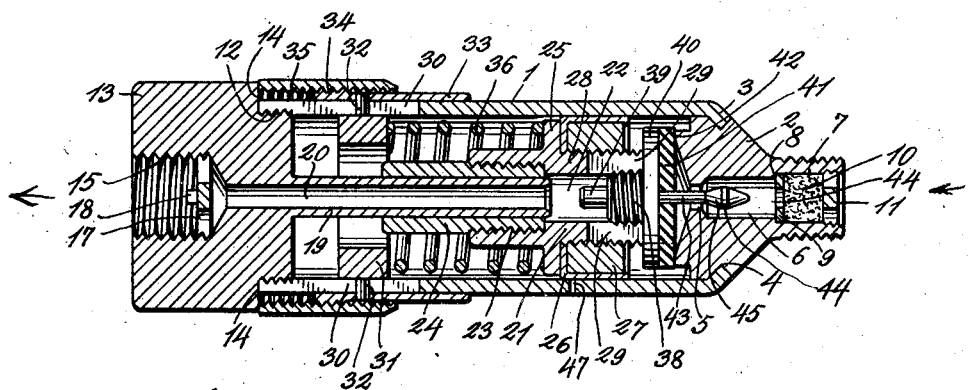
Fig. 2 is a longitudinal diametrical section through the control device, showing the parts in normal or open position; and, Fig. 3 is a fragmentary section showing the parts in operative or closed position.
Figure 3:
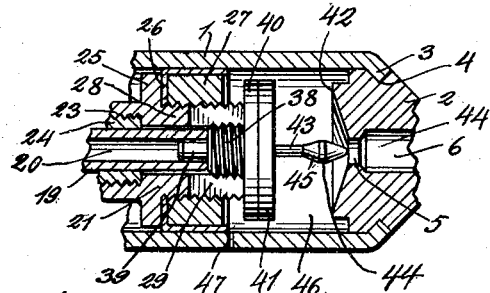

The valve as illustrated consists of a tubular cylindrical member 1 to one end of which a closure 2 has been secured in some suitable way as by having the end 3 spun or crimped into a groove 4 in the member 2. The end closure 2 has an axial opening which has been shown as having three passages, 5, 6 and 7, each of a different diameter. The innermost passage, which has been designated by numeral 5, has the smallest diameter and will be referred to as the inlet port. The passage numbered 6 must have a larger area than the passage 5 for reasons that will become apparent as the description proceeds. The passage 7 has been made a larger diameter than passage 6 merely so that a shoulder 8 will be provided for holding the foraminated disk 9 that serves as a stop for the filter medium 10 which is held in place by means of a perforated nut 11 that is threadedly connected to the walls of the passage 7. The other end of the cylindrical member 1 is internally threaded, as indicated by numeral 12, for the reception of the end closure 13 whose outer diameter is somewhat greater than that of the tube 1 so that a shoulder 14 is formed, for a purpose that will hereinafter appear. The end closure 13 has an axial opening, one end of which is threaded in the manner indicated at 15 and is adapted to be threadedly connected to the end of a valve stem 16 in the manner indicated by dotted lines in Fig. 1. A thin nut 17 is threaded into the opening 15 and carries a projection 18 that is adapted to engage the stem of the valve portion of a valve that is usually employed in ordinary tire valves, so as to hold the valve open in order to reduce the resistance to the flow of air. Extending inwardly from the end closure 13 is a tube 19 which may be formed integral with the closure in the manner shown. The opening 20 in the tubular member 19 communicates with the threaded opening 15. Slidably connected with the cylinder 1 is a piston having a central cylindrical portion 21 that has an axial opening 22, one end of which is preferably of somewhat larger diameter than the other and threaded, as indicated by numeral 23, for the reception of the threaded end of the tube 24. An annular flange 25 surrounds the member 21 at a point intermediate its ends and forms the seat against which the bottom 26 of the leather cup is forced by the clamping nut 27, which is threadedly connected with the cylindrical end 28. The part 28 has a plurality of slots 29 that serve as air passages. The member 1 has two diametrically located longitudinal slots 30. Located within the member 1 is a ringlike abutment member 31 which carries diametrically located pins 32 that extend through the slots 30 and through suitable openings in the sleeve 33, so that when the sleeve 33 is moved the abutment ring 31 will also be moved. The end of the sleeve 32 that is nearest the end closure 13 has a short portion of its outer surface threaded in the manner indicated by numeral 34. A ring or sleeve 35 has its inner surface threaded so as to cooperate with the threads 34 on the sleeve 33 and has one end abutting the shoulder 14. A spring 36 has one end in contact with the abutment ring 31 and the other with the flange 25 and is normally compressed whereby it produces a force that tends to move the piston towards the end closure 2. By rotating the sleeve 35 the abutment ring 31 may be moved towards and away from the end 13 so as to vary the pressure that the spring exerts on the piston. Graduations 361 may be applied to the outside of member 1 and other graduations 37 to the beveled edge of the sleeve 35 so as to make it possible to calibrate the valve and make it possible to set it so as to operate at any pressure desired. The inner surface of the opening 22 is threaded for the reception of the threaded plug 38. This plug carries on its inner end a cylindrical projection 39 of an outside diameter substantially the same as the inside diameter of the tube 19 so that when it enters the end of this tube it practically closes it. The outer end of the plug 38 has a flange 40 against which the leather or rubber sealing member 41 rests. This sealing member is forced by the action of the spring 36, against the shoulder 42, so as to prevent air from flowing from the valve stem 16 outwardly through the inlet port 5. Secured to the plug 38 is a cylindrical pin comprising two cylindrical portions 43 and 44 of different diameters. The outer end portion 44 is of larger diameter than the portion 43 and is joined to the latter by an inclined part 45. When the parts are in the position shown in Fig. 2, the part 43 is within the inlet port 5 and leaves an annular space for the entrance of air. The area of this annular space is as large as practicably possible and may approach quite closely to the minimum area of the passage between the pressure chamber 46 and the tire but should preferably be slightly less so as to prevent the building up of a pressure, in chamber 46, that greatly exceeds the pressure in the tire, which would be the case if the inlet port were too large. It is evident, however, that when the tire pressure is very low air will enter faster than it will after the pressure increases so that the relation between the pressure in the tire and in the compression chamber 46 is not of great importance during the first period of the inflation. It will be noted that in the construction shown the piston has only a very short distance to move from normal position (Fig. 1) to the position in which the end of the plug 39 begins to enter the tube 19 and therefore the spring 36 is normally under compression. The effect of having the spring under considerable compression at open position is that the piston will not move appreciably until the pressure in the chamber 46 approaches the maximum pressure desired in the tire. As soon as the piston begins to move towards closing position, the conical part 45 of the pin will be moved towards the inlet port 5 and will gradually reduce the area through which the air enters. A short time before the valve closes, the part 44 of the pin will enter the inlet port whose area will now be reduced to such an extent that the pressure in chamber 46 will be about the same as that in the tire whereby the actual closing of the valve will be determined by the pressure in the tire and not by the pressure in the supply. When the end of the plug enters the tube 19, it practically closes the entrance to the tire and the pressure in the chamber 46 almost immediately builds up to the pressure of the supply. This high pressure causes the piston to move until the end of the plug 38 seats against the end of the tube 19. Just before the piston stops moving an opening 47 is uncovered and the air that escapes through this opening forms an audible signal that notifies the operator that the valve has closed. When the signal has operated the air hose chuck 48 may be removed, as soon as this is done the spring 36 returns the piston to the position in Fig. 2 and moves the sealing member 41 against the shoulder 42 whereby the inlet port is closed against the exit of air from the tire. The chuck 48 in the end of the tire hose is, of course, provided with the usual automatically closing check valve that prevents the air from flowing from the compressed air tank 49 when the air hose and chuck are not employed for inflating tires.

It will be apparent from the above description that I have produced a device which has several new features and which forms a valve device having a compression chamber provided with an inlet and an outlet port in which the inlet port is of less area than the outlet port so as to prevent the building up of a false pressure in the compression chamber. Another important feature of this invention is that it has means for decreasing the area of the inlet port as the pressure within the compression chamber approaches the pressure at which the valve is to close and means for permitting the piston to move and uncover a signal opening after the valve has closed and in addition to this is has means for closing the inlet port so that air cannot flow from the tire out through the inlet port. This is important as without this it would be impracticable to hold the valve in the valve stem open during inflation.

The embodiment shown has means for adjusting the tension of the spring which permits the pressure at which the valve closes to be changed by merely rotating the sleeve 35. The parts 32, 33, 34 and 35 may, however, be dispensed with as it is questionable whether this convenient adjustment is a desirable feature as each automobile usually carries the same pressure at all times.

In addition to the other features enumerated, I also want to call attention to the fact that when this valve closes it closes the outlet port and leaves the inlet port partly open. By this simple expedient a positively closing valve is obtained that remains closed until the air hose is removed.

Having now described my invention what I claim as new is:

1. In a device for controlling the inflation of an air tight chamber from a source of compressed air of higher pressure than that to which the chamber is to be inflated, comprising, in combination, a body member having a cylindrical chamber closed at one end and open at the other, a piston slidably mounted in said chamber, means comprising a spring for producing a force tending to move the piston towards the closed end of the chamber so as to reduce the volume of the space between the piston and the closed end to a minimum, said closed end having an inlet port in communication with said space, an outlet port also in communication with said space, and means operated by the movement of the piston for closing the outlet port when the piston has moved a predetermined distance from its normal position and means operated by the movement of the piston for decreasing the area of the inlet port before the outlet port is closed.

2. In a device for controlling the inflation of an air tight chamber from a source of compressed air of higher pressure than that to which the chamber is to be inflated, comprising, in combination, a body member having a cylindrical chamber closed at one end and open at the other, a piston slidably mounted in said chamber, means comprising a spring for producing a force tending to move the piston towards the closed end of the chamber so as to reduce the volume of the space between the piston and the closed end to a minimum, said closed end having an inlet port in communication with said space, an outlet port also in communication with said space, said inlet port having a smaller area than the outlet port, means operated by the movement of the piston for closing the outlet port when the piston has moved a predetermined distance from its normal position and means controlled by the movement of the piston for decreasing the effective area of the inlet port before the outlet port is closed.

3. In a device for controlling the inflation of an air tight chamber from a source of compressed air of higher pressure than that to which the chamber is to be inflated, comprising, in combination, a body member having a cylindrical chamber closed at one end and open at the other, a piston slidably mounted in said chamber, means comprising a spring for producing a force tending to move the piston towards the closed end of the chamber so as to reduce the volume of the space between the piston and the closed end to a minimum, said closed end having an inlet port in communication with said space, an outlet port also in communication with said space, said inlet port having a smaller area than the outlet port, means operated by the movement of the piston for closing the outlet port when the piston has moved a predetermined distance from its normal position, means controlled by the movement of the piston for decreasing the effective area of the inlet port before the outlet port is closed and means for permiting the piston to move for a short distance after the outlet port has been closed, whereby a signal may be operated.

4. In a device for controlling the inflation of an air tight chamber from a source of compressed air of higher pressure than that to which the chamber is to be inflated, comprising, in combination, a body member having a cylindrical chamber closed at one end and open at the other, a piston slidably mounted in said chamber, means comprising a spring for producing a force tending to move the piston towards the closed end of the chamber so as to reduce the volume of the space between the piston and the closed end to a minimum, said closed end having an inlet port in communication with said space, an outlet port also in communication with said space, said inlet port having a smaller area than the outlet port, means operated by the movement of the piston for closing the outlet port when the piston has moved a predetermined distance from its normal position, means controlled by the movement of the piston for decreasing the effective area of the inlet port before the outlet port is closed, means for permitting the piston to move for a short distance after the outlet port has been closed, whereby a signal may be operated and means for closing the inlet port when the piston is in normal position.

5. In a device for controlling the inflation of an air tight chamber from a source of compressed air of higher pressure than that to which the chamber is to be inflated, comprising, in combination, a body member having a cylindrical chamber closed at one end and open at the other, a piston slidably mounted in said chamber, means comprising a spring for producing a force tending to move the piston towards the closed end of the chamber so as to reduce the volume of the space between the piston and the closed end to a minimum, said closed end having an inlet port in communication with said space, an outlet port also in communication with said space, said inlet port having a smaller area than the outlet port, means operated by the movement of the piston for closing the outlet port when the piston has moved a predetermined distance from its normal position, means controlled by the movement of the piston for decreasing the effective area of the inlet port before the outlet port is closed, means for permitting the piston to move for a short distance after the outlet port has been closed, whereby a signal may be operated, means for closing the inlet port when the piston is in normal position and means attached to the walls of the outlet port for opening a check valve in a valve stem.

In testimony whereof I affix my signature.

MARTIN E. ANDERSON.